(12) United States Patent
Spivack et al.

(10) Patent No.: US 7,078,613 B2
(45) Date of Patent: *Jul. 18, 2006

(54) STRUCTURED MICRO-CHANNEL SEMICONDUCTOR ELECTRODE FOR PHOTOVOLTAIC CELLS

(75) Inventors: James L. Spivack, Cobleskill, NY (US); Donald F. Foust, Glenville, NY (US)

(73) Assignee: General Electric Company, Schenectady, NY (US)

( * ) Notice: Subject to any disclaimer, the term of this patent is extended or adjusted under 35 U.S.C. 154(b) by 576 days.

This patent is subject to a terminal disclaimer.

(21) Appl. No.: 10/316,519

(22) Filed: Dec. 11, 2002

(65) Prior Publication Data

US 2004/0112422 A1   Jun. 17, 2004

(51) Int. Cl.
*H01L 31/00* (2006.01)
*H01L 31/0236* (2006.01)

(52) U.S. Cl. .................................. 136/256; 136/263

(58) Field of Classification Search ........ 136/243–265; 429/111
See application file for complete search history.

(56) References Cited

U.S. PATENT DOCUMENTS

| | | | | |
|---|---|---|---|---|
| 5,672,214 A | * | 9/1997 | Arthur et al. | 136/250 |
| 6,069,313 A | * | 5/2000 | Kay | 136/249 |
| 6,291,763 B1 | * | 9/2001 | Nakamura | 136/256 |

OTHER PUBLICATIONS

Website "Canadian vs U.S. Cement Types", http://www.cement.org/tech/ca_us_cements.asp, 3 pages. (Printed Sep. 9, 2005).*
Claims of U.S. Appl. No. 10/316,498.*

* cited by examiner

*Primary Examiner*—Nam Nguyen
*Assistant Examiner*—Jeffrey Barton
(74) *Attorney, Agent, or Firm*—Fletcher Yoder

(57) ABSTRACT

A solar cell having a plurality of micro-channels. Specifically, a plurality of micro-channels are formed in a semiconductor material that has been disposed on the surface of a planar electrode. The semiconductor material is saturated with dye and injected with an electrolyte solution. The micro-channels are insulated and filled with a material that provides a catalyst material for the electron transfer to an oxidant during the photovoltaic process. The catalyst disposed in the micro-channels forms the upper electrode of the solar cell. The micro-channels are arranged to provide a reduced migration path for the oxidant.

18 Claims, 7 Drawing Sheets

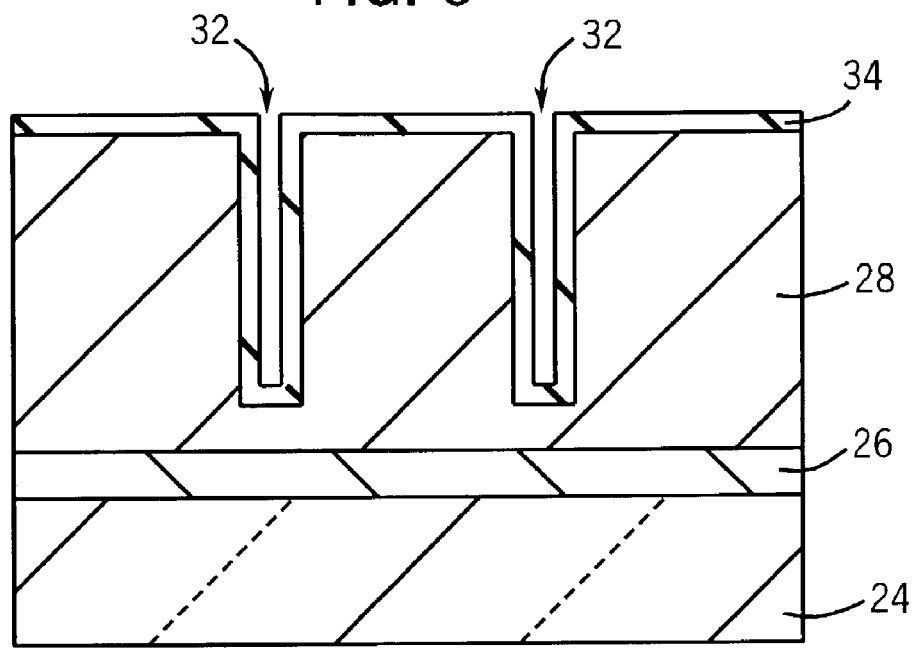
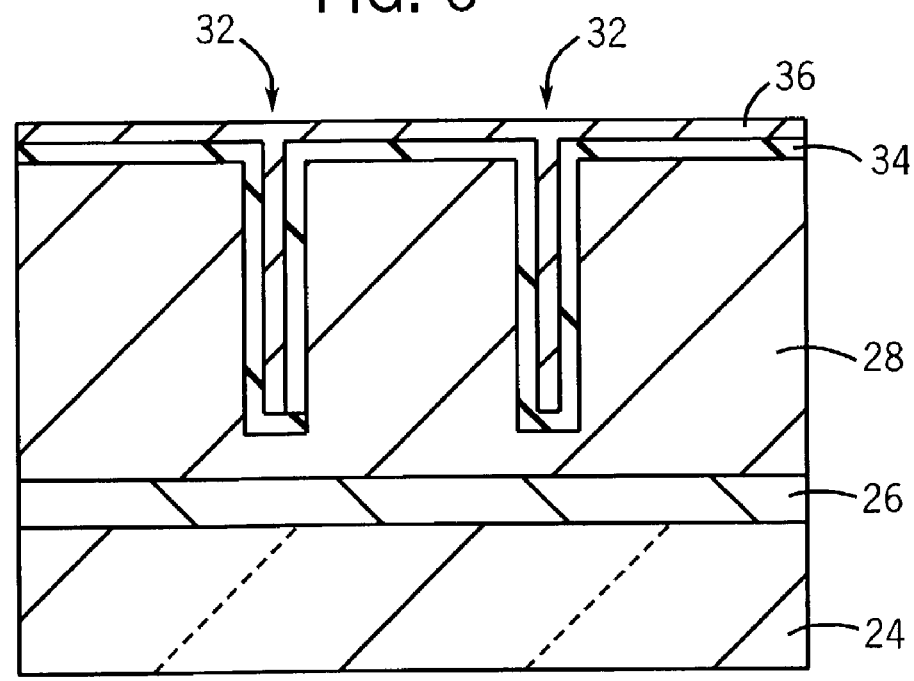

FIG. 7
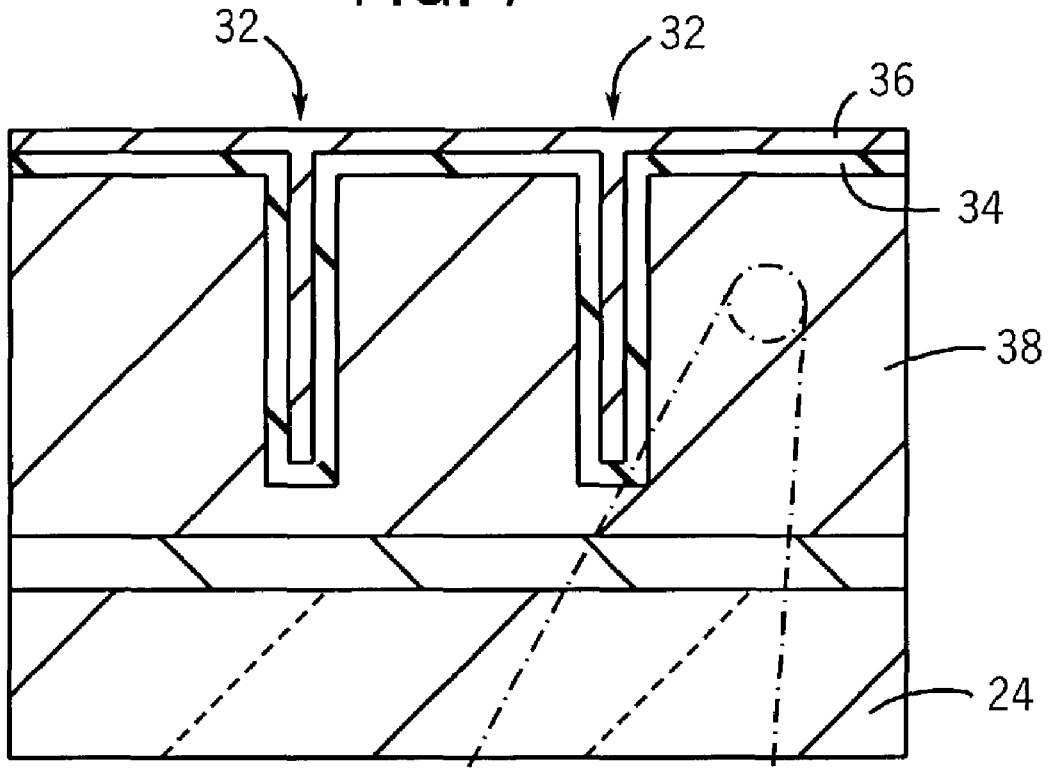
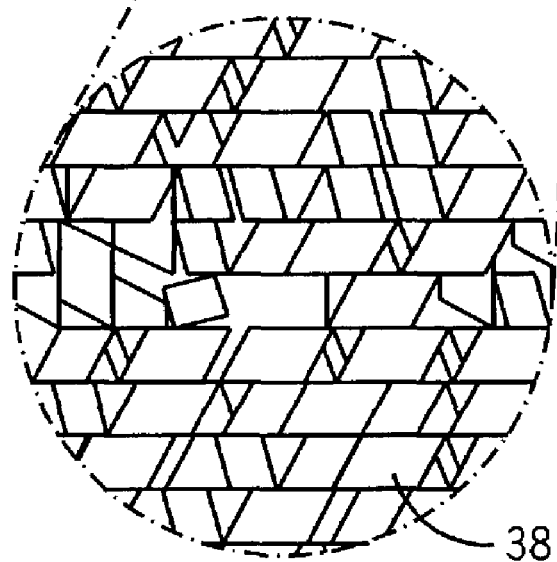

STRUCTURED MICRO-CHANNEL SEMICONDUCTOR ELECTRODE FOR PHOTOVOLTAIC CELLS

CROSS-REFERENCE TO RELATED APPLICATIONS

The following commonly owned applications and patents are hereby incorporated by reference for all purposes:

U.S. patent application Ser. No. 10/316,217, filed concurrently herewith, entitled "Structured Dye Sensitized Solar Cell" by James L. Spivack and Harish R. Acharya;

U.S. patent application Ser. No. 10/316,318, filed concurrently herewith, entitled "Dye Sensitized Solar Cells Having Foil Electrodes" by James L. Spivack, John Yupeng Gui, and Reed Roeder Corderman;

U.S. patent application Ser. No. 10/316,498, filed concurrently herewith, entitled "Dye Sensitized Solar Cell Having Finger Electrodes" by James L. Spivack, Harish R. Acharya, and Donald F. Foust.

BACKGROUND OF THE INVENTION

Generally speaking, photovoltaic systems are implemented to convert light energy into electricity for a variety of applications. Power production by photovoltaic systems may offer a number of advantages over conventional systems. These advantages may include, but are not limited to, low operating costs, high reliability, modularity, low construction costs, and environmental benefits. As can be appreciated, photovoltaic systems are commonly known as "solar cells," so named for their ability to produce electricity from sunlight.

Conventional solar cells convert light into electricity by exploiting the photovoltaic effect that exists at semiconductor junctions. Accordingly, conventional solar cells generally implement semiconductor layers to produce electron current. The semiconductor layers generally absorb incoming light to produce excited electrons. In addition to the semiconductor layers, solar cells generally include a cover or other encapsulant, seals on the edges of the solar cell, a front contact electrode to allow the electrons to enter a circuit, and a back contact electrode to allow the ions created by the excitation of the electrons to complete the circuit.

One particular type of solar cell is a dye-sensitized solar cell. A dye-sensitized solar cell generally uses an organic dye to absorb incoming light to produce excited electrons. The dye sensitized solar cell generally includes two planar conducting electrodes arranged in a sandwich configuration. A dye-coated semiconductor film separates the two electrodes which may comprise glass coated with a transparent conducting oxide (TCO) film, for example. The semiconductor layer is porous and has a high surface area thereby allowing sufficient dye for efficient light absorption to be attached as a molecular monolayer on its surface. The remaining intervening space between the electrodes and the pores in the semiconductor film (which acts as a sponge) is filled with an organic electrolyte solution containing an oxidation/reduction couple such as triiodide/iodide, for example.

One exemplary technique for fabricating a dye-sensitized solar cell is to coat a conductive glass plate with a semiconductor film such as titanium oxide ($TiO_2$) or zinc oxide (ZnO), for example. The semiconductor film is saturated with a dye and a single layer of dye molecules self-assembles on each of the particles in the semiconductor film, thereby "sensitizing" the film. A liquid electrolyte solution containing triiodide/iodide is introduced into the semiconductor film. The electrolyte fills the pores and openings left in the dye-sensitized semiconductor film. To complete the solar cell, a second planar electrode with low overpotential for triiodide reduction is implemented to provide a cell structure having a dye-sensitized semiconductor and electrolyte composite sandwiched between two counter-electrodes.

Conventional dye sensitized solar cells may be fabricated using planar layered structures, as set forth above. The absorption of light by the dye excites electrons in the dye which are injected into the semiconductor film, leaving behind an oxidized dye cation. The excited electrons travel through the semiconductor film by a "random walk" through the adjacent crystals of the film towards an electrode. During the random walk of the electron to the electrode, the electron may travel a significant distance, and the electron may be lost by combining with a component of the electrolyte solution, also known as "recombination." Under irradiation by sunlight, the density of electrons in the semiconductor may be high such that such electron losses significantly reduce the maximum voltage and therefore the efficiency achievable by the solar cells. It may be advantageous to reduce the likelihood of recombination by reducing the travel path of the electron through the semiconductor and thereby reducing the length of time it takes for the electron to diffuse through the semiconductor to the conductive oxide of the electrode. One technique for reducing the travel distance of the electron is to reduce the thickness of the semiconductor film and thus, the distance the electron has to travel to reach an electrode. Disadvantageously, reduction in the thickness of the semiconductor film may reduce the light absorption in the dye, thereby reducing the efficiency of the solar cell.

Further, the injection of the electron from the dye into the semiconductor material leaves behind an oxidized dye cation. The oxidized dye is reduced by transfer of an electron from an iodide ion in the electrolyte, for example, thereby producing a triiodide ion that diffuses through the electrolyte solution to the back electrode where a catalyst supplies the missing electron thereby closing the circuit. The back electrode is generally carbonized or platinized to catalyze the electron transfer to the oxidant in the electrolyte solution, here triiodide. The electrolyte solution is typically made in an organic solvent. Generally speaking, less volatile solvents with a high boiling point are more viscous and impede the diffusion of ions to the point where the diffusion limits the power output and hence the efficiency of the solar cell. Such solvents may be advantageous in providing cell longevity, especially for cells fabricated on a polymer substrate, because polymer substrates may allow less viscous solvents having a low boiling point to diffuse out of the solar cell over time. Because the triiodide ion may originate from anywhere in the part of the electrolyte solution in contact with the dyed surface of the semiconductor, the ion may have to travel a long torturous path through the labyrinth created by the random pore structure of the semiconductor from near the front electrode to the back electrode to complete the circuit. These long paths may limit the diffusion current in the solar cell. Decreasing the travel distance of the ions may advantageously reduce the limitations caused by the slow diffusion of the ions. However, as previously described, reducing the thickness of the semiconductor film to reduce the ion transport path may disadvantageously reduce the light absorption of the dye.

Thus, while it may be advantageous to increase the thickness of the semiconductor film and thereby the surface area of the film to provide increased light absorption, the thicker the semiconductor film, the greater the distance the electrons and ions may have to travel to reach a respective electrode. Although longer light paths may be desirable to facilitate greater light absorption, the losses due to the increased recombination of the electrons into the semiconductor layer, as well as limits to current caused by slow ion diffusion through the electrolyte in the semiconductor pores, make the increased thickness of the semiconductor film disadvantageous since it may produce a less efficient solar cell.

BRIEF DESCRIPTION OF THE INVENTION

In accordance with one aspect of the present technique, there is provided a solar cell comprising: a substrate; a transparent conductive oxide (TCO) layer disposed on the substrate; a semiconductor layer disposed on the transparent conductive oxide (TCO) layer; one or more micro-channels formed in the semiconductor layer; a porous insulative layer disposed on the semiconductor layer and disposed within each of the one or more micro-channels; and a catalyst layer disposed on the insulative layer and disposed within each of the one ore more micro-channels.

In accordance with another aspect of the present technique, there is provided a solar cell comprising: a first electrode; a second electrode adjacent to the first electrode; a semiconductor material coupled between the first electrode and the second electrode and comprising a plurality of channels extending therethrough.

In accordance with yet another aspect of the present technique, there is provided a method of fabricating a solar cell comprising: disposing a porous semiconductor layer on a transparent conducting oxide (TCO) layer; forming a plurality of micro-channels in the porous semiconductor layer; disposing a porous insulative layer on the porous semiconductor layer and in each of the plurality of micro-channels; and disposing a catalyst layer on the insulative layer and in each of the plurality of micro-channels.

BRIEF DESCRIPTION OF THE DRAWINGS

Advantages and features of the invention may become apparent upon reading the following detailed description and upon reference to the drawings in which:

FIGS. 2–9 illustrate cross sectional views of the fabrication of a solar cell having micro-channels, in accordance with the present technique.

DETAILED DESCRIPTION OF SPECIFIC EMBODIMENTS

Figure 1:
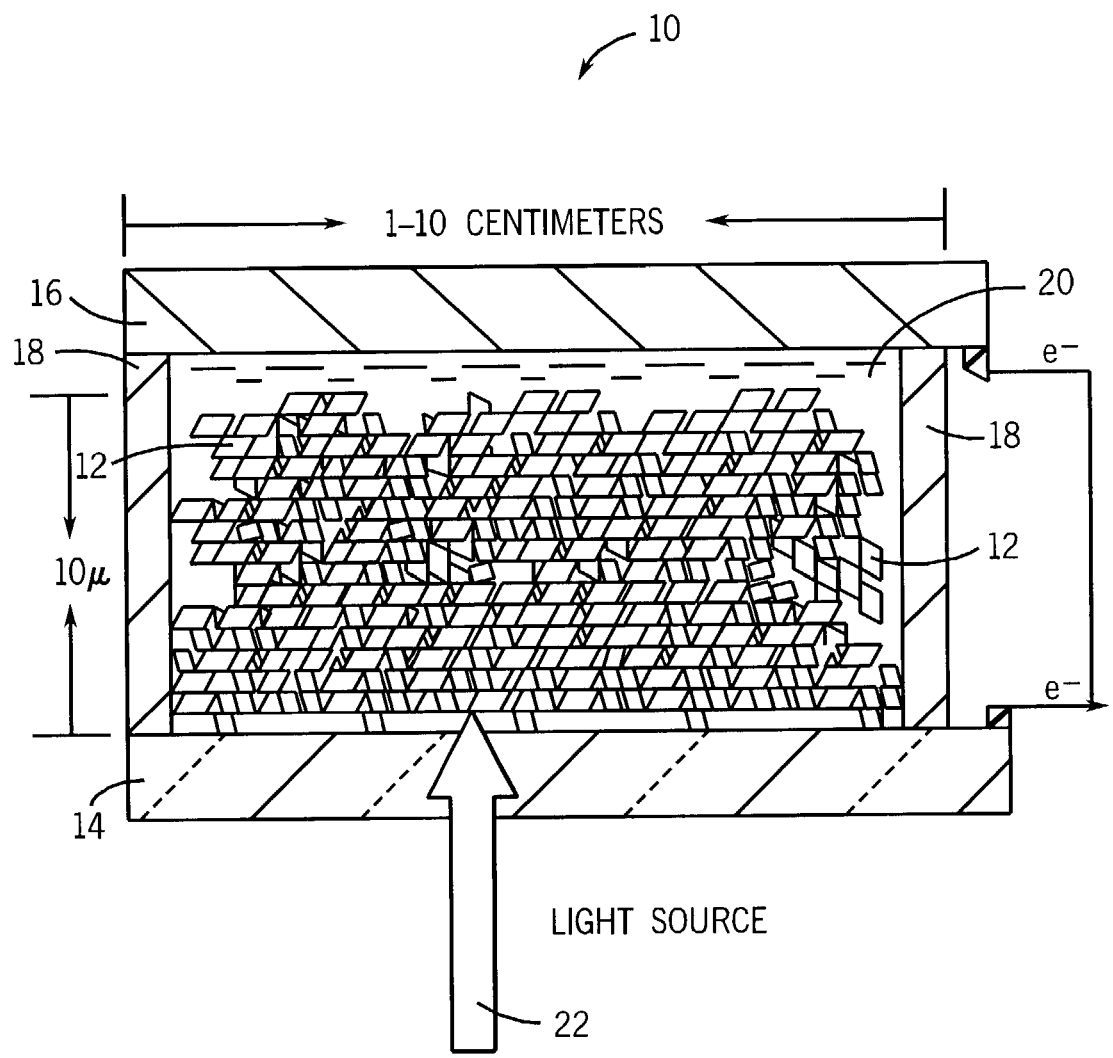
FIG. 1 illustrates a cross-sectional view of an exemplary embodiment of a dye-sensitized solar cell.

FIG. 1 illustrates an exemplary embodiment of a dye-sensitized solar cell 10. As can be appreciated, the solar cell 10 may be constructed by implementing planar layered structures. The solar cell 10 may be fabricated by implementing any one of a number of techniques and using a variety of materials, as can be appreciated by those skilled in the art. In one embodiment, a layer of semiconductor material, such as a layer of nanocrystalline titanium dioxide ($TiO_2$) 12 may be disposed on a transparent substrate 14, such as a glass substrate. The substrate 14 is coated with a conductive layer such as a transparent conducting oxide (TCO) layer. The TCO coated transparent substrate 14 forms the front electrode of the solar cell 10. As can be appreciated, the substrate 14 may comprise other transparent materials such as plastic. The $TiO_2$ layer 12 may be disposed at a thickness in the range of 5–20 microns, for example. The $TiO_2$ layer 12 is generally disposed at a thickness of at least 10 microns to facilitate efficient light absorption, as explained further below. The $TiO_2$ layer 12 of the exemplary solar cell 10 has a thickness of approximately 10 microns, as illustrated in FIG. 1. The $TiO_2$ layer 12 may be sintered or dried and pressed or chemically modified to provide mechanical strength, electrical conductivity and adherence to the substrate.

A back electrode 16 may be positioned on top of the $TiO_2$ layer 12. The back electrode 16 may be coated with a platinized TCO layer. The back electrode 16 may be positioned such that a small space (one micron, for example) is provided between the $TiO_2$ layer 12 and the back electrode 16. Accordingly, minimal contact points (or no contact points, as in the present exemplary embodiment) may exist between the $TiO_2$ layer 12 and the back electrode 16. A seal 18, such as an organic material or glass for instance, is provided to seal the edges of the solar cell 10. As can be appreciated, while the height of the solar cell 10 may be in the range of 5–20 microns, the lateral dimension of the solar cell 10 (i.e. between each of the seals 18) may be in the range of 0.5–10 centimeters, for instance. The lateral dimension of the exemplary solar cell 10 is illustrated as having an exemplary range of approximately 1–10 centimeters, for example.

The back electrode 16 may include filling holes (not shown) through which a solution of dye suitable for sensitizing the titanium oxide layer 12 can be injected. As can be appreciated by those skilled in the art, the dye used to saturate and sensitize the $TiO_2$ layer 12 may include group VIII metal complexes of bipyridine carbonoxylic acids, such as $Ru(4,4'\text{-dicarboxy-2,2'-bipyridyl})_2SCN)_2$, for instance. Once the $TiO_2$ layer 12 is saturated, the dye-coated $TiO_2$ layer 12 may be rinsed and cleaned, as can be appreciated by those skilled in the art. An electrolyte layer 20 is injected through the filling holes in the back electrode 16 to fill the pores in the semiconductor film and the remaining space between the glass substrate 14 and the back electrode 16. The electrolyte layer 20 facilitates the movement of ions formed by a separation of electrons in the dye sensitized $TiO_2$ layer 12 upon exposure by an incident light source 22, such as sunlight, as explained further below. Finally, the filling holes may be sealed and electrical contact is made between the glass substrate 14 and the back electrode 16.

As illustrated with respect to FIG. 1, the light path through the sensitized $TiO_2$ layer 12 is approximately 10 microns. When an incident light source 22 is directed through the glass substrate 14, the incident light excites electrons within the dye, and the electrons are transferred into the $TiO_2$ layer 12. The electrons migrate through the adjacent crystals in the $TiO_2$ layer 12 through a "random walk." While the maximum distance of any of the particles in the $TiO_2$ layer 12 is approximately 10 microns from the glass substrate 14, the distance an electron may travel through the $TiO_2$ layer 12 to reach the glass substrate 14 may be significantly greater than 10 microns as the electron randomly migrates through adjacent nanocrystals in the $TiO_2$ layer 12. During the random walk of the electron to the glass substrate 14, the electron may be lost by combining with a component of the electrolyte layer 20. In general, the longer it takes for an electron to diffuse through the $TiO_2$ layer 12 to the underlying TCO coated substrate 14, the more likely that the electron will disadvantageously recombine. Under irradiation by sunlight the density of the electrons in the $TiO_2$ layer 12 may be high enough that the losses significantly reduce the maximum voltage and therefore the efficiency achievable by the solar cell 10. As previously discussed, reducing the thickness of the $TiO_2$ layer 12 to reduce the likelihood of electron recombination during the random walk by decreasing the migration path of the electrons is disadvantageous, because reducing the thickness of the $TiO_2$ layer 12 reduces the light absorption potential of the $TiO_2$ layer 12.

Further, ions formed by reaction of components of the electrolyte with dye molecules which have injected excited electrons into the semiconductor migrate to the back electrode 16 through the electrolyte 20 to complete the circuit. Because the $TiO_2$ layer 12 is "porous" and therefore comprises a continuous system of pores, ions in the electrolyte 20 can diffuse through the $TiO_2$ layer 12. In the present exemplary embodiment, the maximum distance from any ion to the back electrode 16 is the thickness of the $TiO_2$ layer 12 plus the additional space between the $TiO_2$ layer 12 and the back electrode 16. In the present exemplary embodiment, the maximum distance from any ion to the back electrode is approximately 11 microns. As previously described, the electrolyte layer 20 is typically an organic solvent. While polar, stable and non-viscous solvents are desirable, the solvents implemented in the solar cell 10 such as acetonitrile, are generally volatile. Generally speaking, less volatile solvents are more viscous and impede the diffusion of ions to the point where the diffusion limits the power output and therefore the efficiency of the solar cell 10. In solar cells 10 implementing a plastic substrate 14, the loss of volatile solvents may create even more of a problem.

In summary, the solar cell 10 of FIG. 1 includes a $TiO_2$ layer 12 coated with dye and disposed at a thickness of about 10 microns onto a TCO coated planar substrate 14. A platinized TCO coated glass substrate provides the back electrode 16. The $TiO_2$ layer 12 is in direct contact with the glass substrate 14 to provide an electrical connection for the excited electrons, and the contact area is advantageously maximized to provide increased electron paths through the $TiO_2$ layer 12 to the substrate 14. Conversely, the contact area between the $TiO_2$ layer 12 and the back electrode layer 16 is minimized and in the present exemplary embodiment, does not exist (i.e. the $TiO_2$ layer 12 is electrically isolated from the electrode layer 16). The shortest light path through the $TiO_2$ layer 12 is 10 microns. Although longer light paths may be desirable to provide more light absorption, the losses due to increased recombination and from ion diffusion limitations make thicker layers of the solar cell 10 less efficient.

FIGS. 2–10 illustrate an exemplary method for fabricating solar cells in accordance with the present techniques. Generally speaking, the present techniques implement structured micro-channel electrodes which allow the solar cell to maintain an adequate light path through the dye sensitized semiconductor layer while reducing the distances that the electrons travel through the semiconductor layer and/or by reducing the distance that the oxidant ions travel through the electrolyte. Advantageously, the present techniques reduce the recombination losses (i.e., electron losses from the semiconductor layer to a component of the electrolyte) and reduces ion diffusion losses in the electrolyte, thereby increasing the efficiency of the solar cell. Since the efficiency of the solar cell is a major consideration in the cost of the power produced by the cells, the techniques implementing the structured micro-channel electrodes advantageously reduce the cost per watt delivered, as well.

Figure 2:
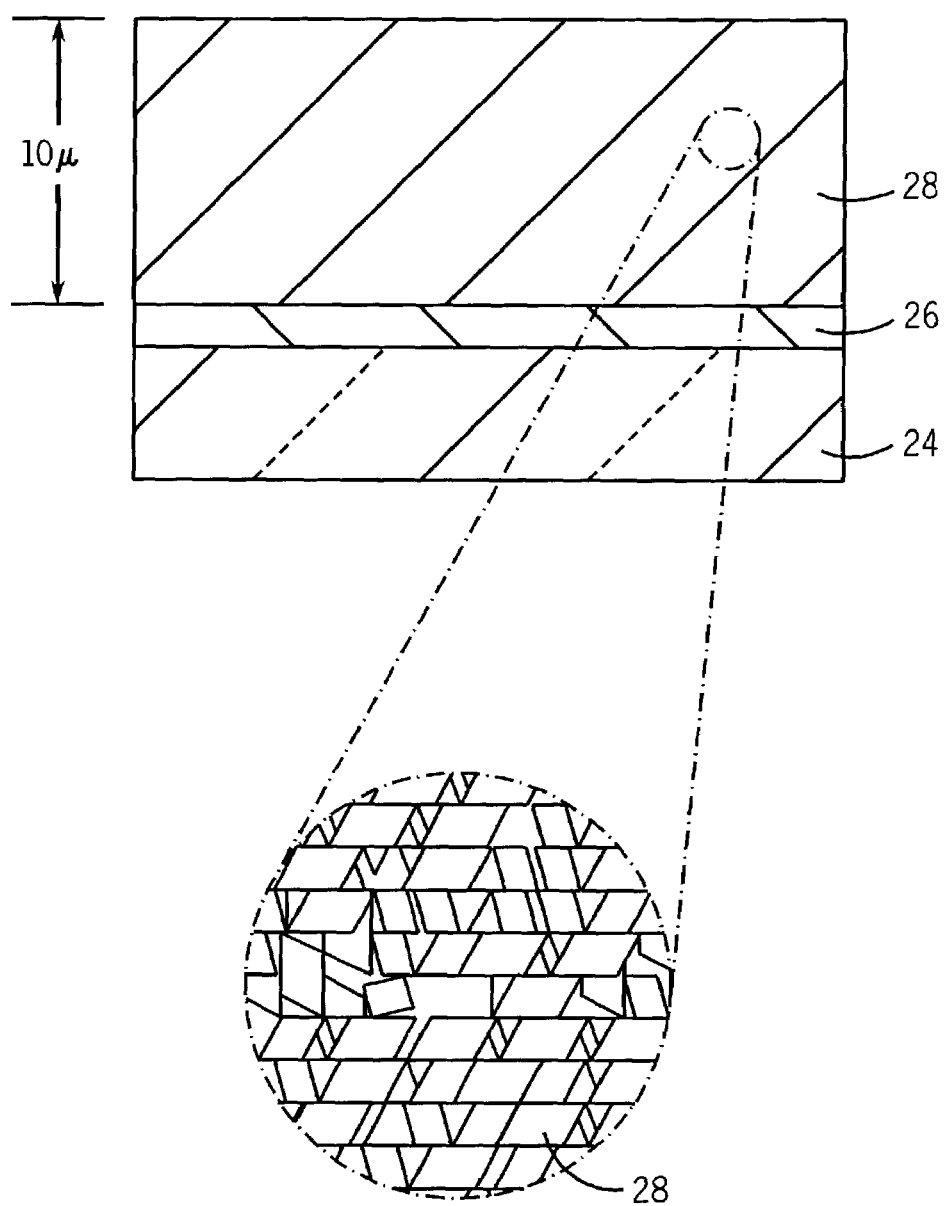

Referring specifically to FIG. 2 a cross-sectional view of a substrate 24 is illustrated. The substrate 24 is a transparent material, such as glass, which will ultimately form the front electrode of the solar cell. The substrate 24 is coated with a transparent conducting oxide (TCO) layer 26, such as fluorinated tin oxide (F—$SnO_2$), for example. A semiconductor layer 28, such as a titanium oxide ($TiO_2$) layer or a zinc oxide (ZnO) layer, is disposed on the TCO layer 26. In the present exemplary embodiment, the semiconductor layer 28 comprises a nanocrystalline $TiO_2$ layer. The nanocrystalline $TiO_2$ layer is generally a sintered porous film having nanocrystals in the range of approximately 10–400 nanometers as best illustrated in the exploded view of FIG. 2. The semiconductor layer 28 is generally disposed at a thickness in the range of 1–50 microns. In the present exemplary embodiment, the semiconductor layer 28 has a thickness of approximately 10 microns, as illustrated in FIG. 2.

Figure 3:
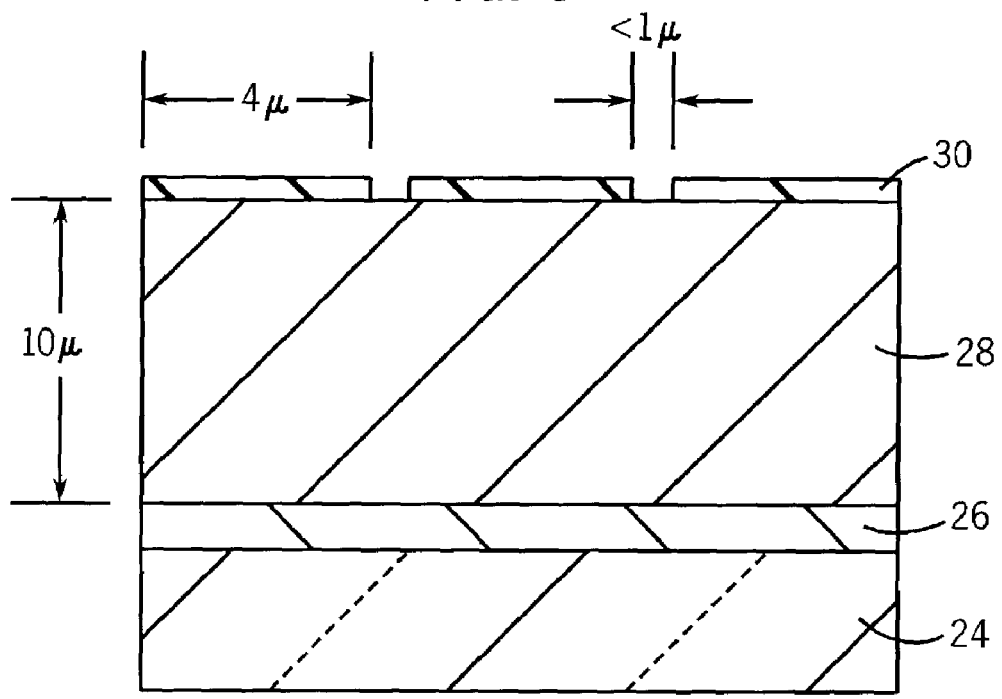

To create the structured micro-channels of the solar cell in accordance with the present techniques, a mask layer 30 is deposited on the semiconductor layer 28, as illustrated in FIG. 3. The mask 30 is generally a material that is resistant to plasma etching, such as nickel, for example. The mask layer 30 may be disposed by a sputtering technique, for example. The mask layer 30 is patterned to define a number of structured micro-channels that will be formed in the semiconductor layer 28, as described further below. The present exemplary mask layer 30 is patterned to provide micro-channels having a width of approximately 1 micron, for example. Accordingly, the mask layer 30 is patterned such that apertures having a width of approximately 1 micron are formed, as illustrated in FIG. 3. The openings in the mask layer 30 define exposed regions in the semiconductor layer 28, which can be etched, as further described below. In the present exemplary embodiments, the mask layer 30 is patterned to facilitate the formation of 1 micron channels separated by a distance of approximately 4 microns. As can be appreciated, the aperture widths in the mask layer 30 and the spacing between the apertures may be adjusted to facilitate the formation of channels having alternate widths and alternate spacing between the micro-channels.

Figure 4:
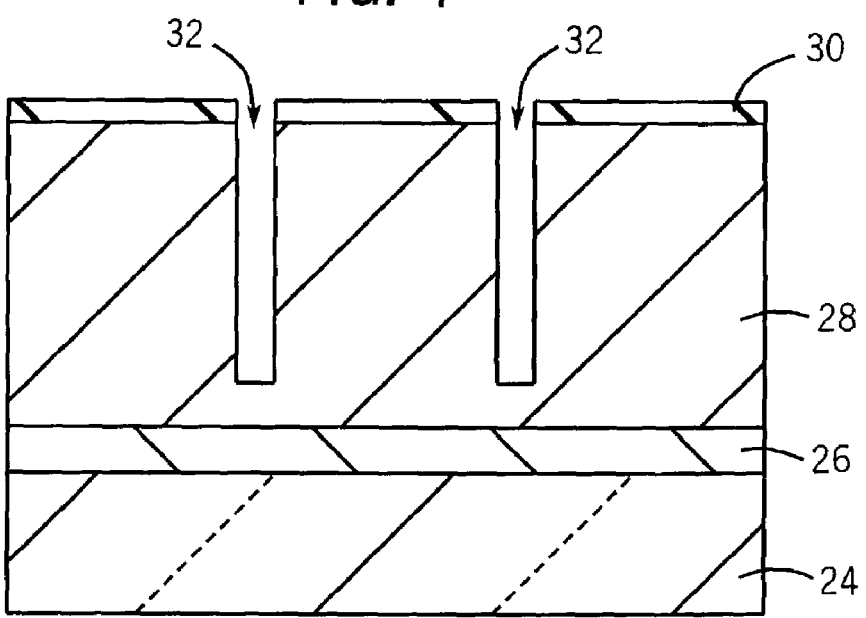

FIG. 4 illustrates the formation of the micro-channels 32. As previously described, the apertures in the mask layer 30 define openings that can be etched. In one exemplary embodiment, the micro-channels 32 are etched by a dry plasma etch, for example. Accordingly, the mask layer 30 is resistant to plasma etching. Alternatively, a wet chemical etch may be used to form the micro-channels 32. As can be appreciated, the material chosen for the mask layer 30 may vary depending on the etch process and the etchant that are implemented to form the micro-channels 32. As further discussed below, the etch process is timed such that the micro-channels 32 do not extend entirely through the semiconductor layer 28, as illustrated in FIG. 4. Accordingly, a portion of the semiconductor layer 28 exists between the bottom of the micro-channels 32 and the TCO layer 26.

After the micro-channels 32 have been etched in the semiconductor layer 28, the mask layer 30 is removed via a chemical rinse, for example. Next, a thin insulative layer 34 is coated over the exposed surface of the semiconductor layer 28, as illustrated in FIG. 5. The insulative layer 34 is disposed such that the walls within the micro-channels 32 are completely coated with the insulative layer 34. The walls of the channels 32 may be coated with a porous insulative layer 34 by chemical vapor deposition (CVD), for example. The insulative layer 34 generally comprises a porous, non-conductive material. Because the insulative layer 34 is "porous" and therefore comprises a continuous system of pores, ions in the electrolyte solution can diffuse through the insulative layer 34. The insulative layer 34 may be an alumina, such as $Al_2O_3$, or a silica, such as $SiO_2$, for example. The insulative layer 34 is advantageously porous to allow the oxidant ions, such as triiodide ions, to diffuse through the insulative layer 34, as discussed further below.

Next, the surface of the structure is platinized. That is to say, a thin platinum layer 36 is disposed over the structure, as indicated in FIG. 6. The platinum layer 36 is disposed such that it completely fills the micro-channels 32 or forms a continuous conducting film down most of the channel. By platinizing the surface of the semiconductor layer 28, the back electrode of the solar cell is formed. As previously described, ions formed by reaction of components of the electrolyte with dye molecules which have injected excited electrons into the semiconductor, diffuse to the back electrode of the solar cell. The platinum layer 36 provides the catalyst for electron transfer from the oxidant in the electrolyte (previously discussed and discussed further below), such as triiodide, to complete the circuit of the solar cell. As can be appreciated, the catalyst may comprise a carbon layer or a graphite layer, rather than the platinum layer 36, depending on the oxidant formed in the electrolyte solution.

After deposition of the platinum layer 36, the semiconductor layer 28 is coated with a monolayer of dye, thereby forming a dye-sensitized semiconductor layer 38, as illustrated in FIG. 7. As can be appreciated, the dye-sensitized semiconductor layer 38 generally comprises the porous nano-crystalline semiconductor layer 28 having a single layer of dye molecules attached to each nanocrystal of the semiconductor layer 28, thereby providing the reactive element of the solar cell as best illustrated in the exploded view of FIG. 7. The dye solution may be introduced to the semiconductor layer 28 by a conventional means of pumping an organic solvent comprising the die solution through the semiconductor layer 28 from one of the exposed edges of the semiconductor layer 28. Once the dye is pumped through the semiconductor layer 28 to form the dye-sensitized semiconductor layer 38, the dye-sensitized semiconductor layer 38 may be cleaned and dried as can be appreciated by those skilled in the art.

Figure 8:
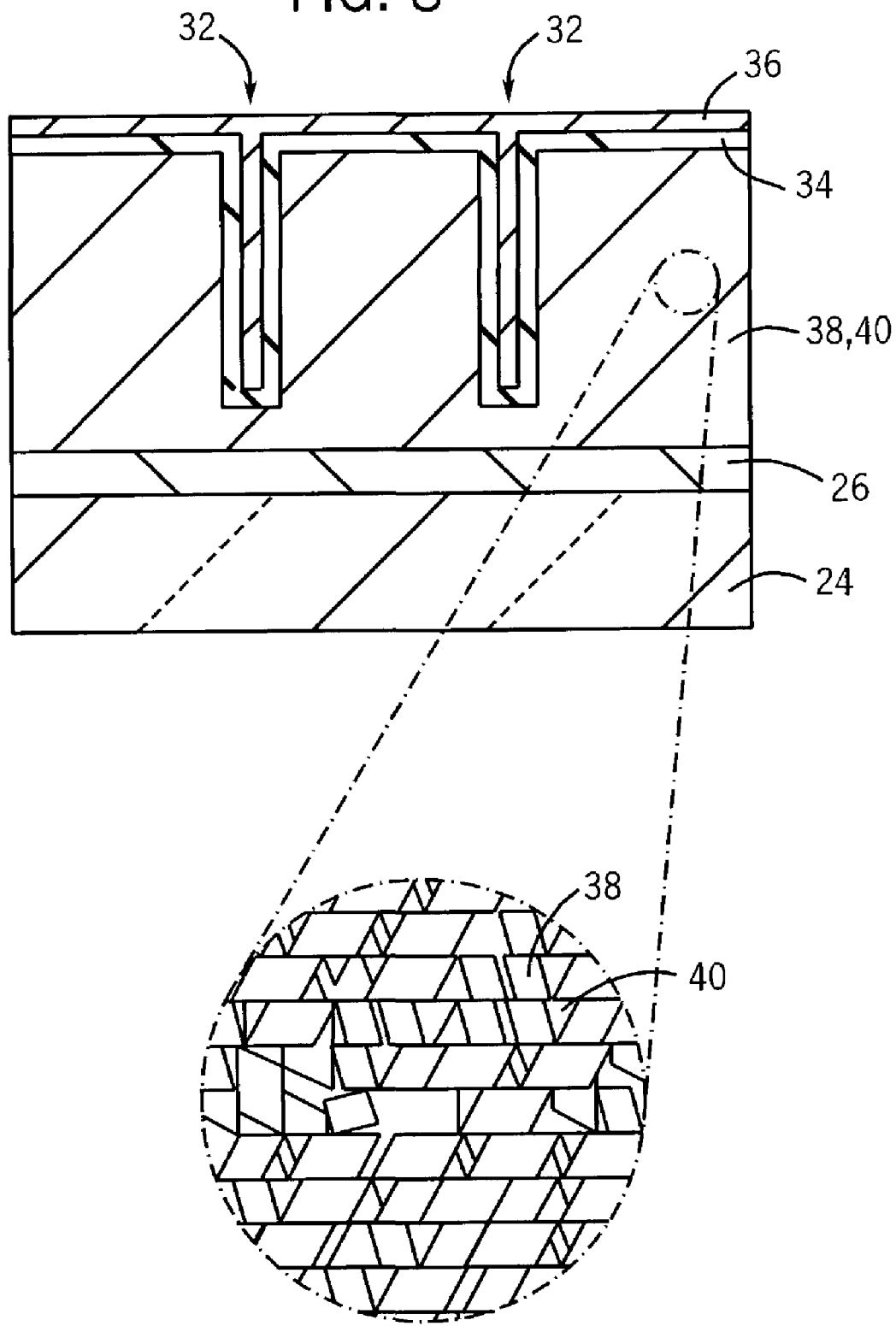

Next, an electrolyte solution 40 is introduced to the dye-sensitized semiconductor layer 38, as illustrated in FIG. 8. As previously described, the dye-sensitized semiconductor layer 38 comprises a porous semiconductor material such as titanium oxide ($TiO_2$), for example. The electrolyte solution 40 fills the remaining area between the substrate 24 (the front electrode) and the platinum layer 36 (the back electrode), including the porous areas separating the individual crystals of the semiconductor layer 38, as best illustrated in the exploded view of FIG. 8. The electrolyte solution 40 generally includes iodide and/or triiodide salts in an organic solvent. The iodide in the electrolyte solution 40 provides the reductant for the cation produced by the excitation of the electron in the dye. Further, the electrolyte solution 40 may include additives, as can be appreciated by those skilled in the art.

Figure 9:
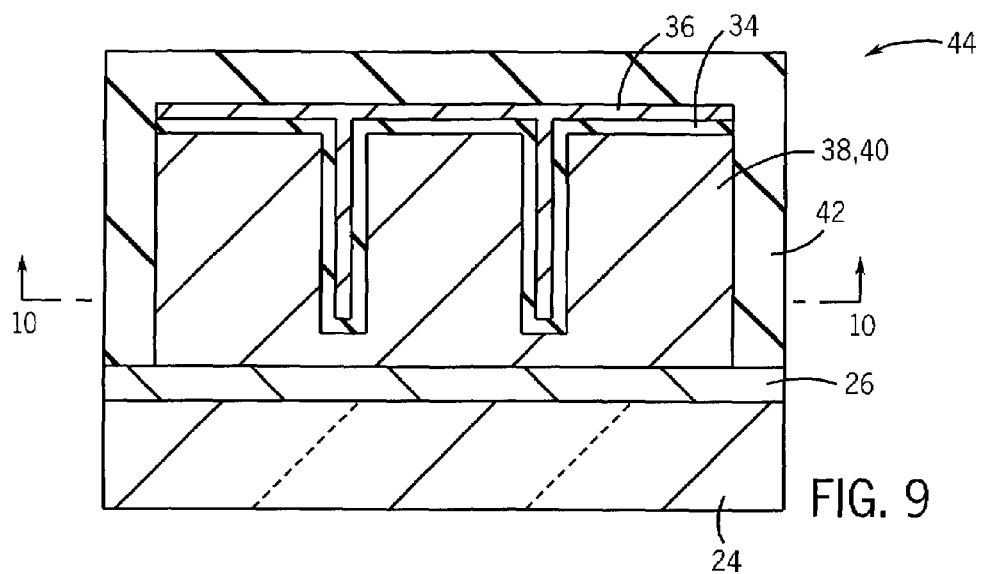
Figure 10:
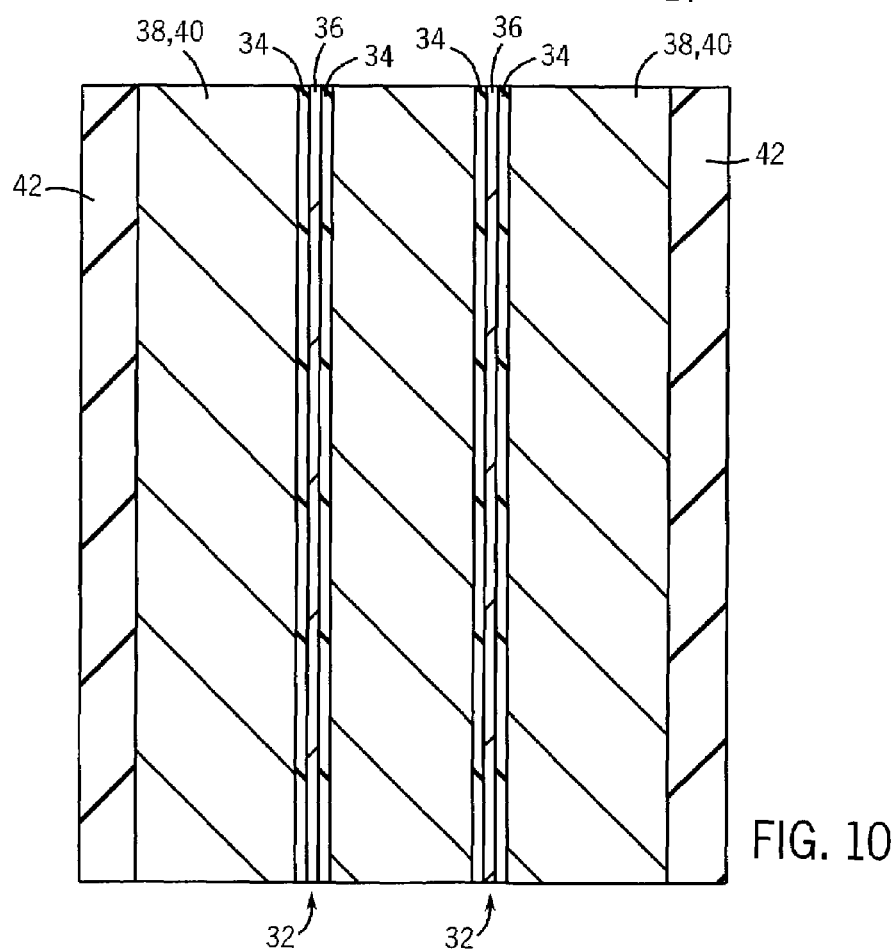
FIG. 10 illustrates an alternate view of the solar cell fabricated in accordance with the present technique.

Finally, the structure is sealed or encapsulated by a sealing layer 42, to form the completed solar cell 44 having micro-channels 32 in accordance with the present techniques, as illustrated in FIGS. 9 and 10. As can be appreciated, the sealing layer 42 may include an organic material or glass, for instance. The sealing layer 42 generally protects the solar cell 44 from external elements. While not illustrated in the present figures, it should be understood that there are electrical contacts to the TCO layer 26 and the platinum layer 36 which complete the circuit of the solar cell 44, as can be appreciated by those skill in the art. FIG. 10 illustrates a cross sectional view of the solar cell 44 illustrated in FIG. 9, taken along the cut lines 10—10. As illustrated in FIG. 10, the micro-channels 32 (which are filled with the insulator layer 34 and platinum layer 36) extend along the length of the solar cell 44, in a direction that is perpendicular to the structure illustrated in FIG. 9 (i.e. perpendicular to the surface of the page). As previously described, the micro-channels 32 in the present exemplary embodiment are approximately 1 micron wide and separated from directly adjacent micro-channels 32 by approximately 4 microns.

As can be appreciated, the improved solar cell 44 functions in a manner similar to conventional solar cells but having improved performance. As previously described, once light from an incident light source is directed through the substrate 24 and the TCO layer 26, it is absorbed by the dye in the dye-sensitized semiconductor layer 38. The absorption of the light produces an excited electron in the dye which is injected into the semiconductor material of the dye-sensitized semiconductor layer 38. The excited electron migrates to the TCO layer 26 and is collected in the external circuit of the solar cell 44. The dye molecule that injected the electron into the semiconductor material then accepts an electron from the reductant in the electrolyte, such as iodide, thereby leaving an oxidant, such as triiodide. The platinum layer 36 provides the counter electrode for the solar cell 44. The oxidant diffuses through the electrolyte solution 40 and through the insulative layer 34 to the platinum layer 36 where it accepts electrons from the external circuit of the solar cell 44, thereby producing electrical current and completing the photovoltaic effect.

One advantage of the present exemplary solar cell design incorporating micro-channels 32 is the reduction in the maximum distance from any point in the electrolyte solution to the catalyzing platinum layer 36. For example, the maximum straight line distance that the oxidant must diffuse has been reduced from 10 microns in a standard cell design, such as the solar cell 10 of FIG. 1, to only about 2 microns, as in the present exemplary solar cell 44. As previously discussed, by reducing the travel distance of the oxidant, the internal resistance of the cell is reduced. Advantageously, the present exemplary embodiment permits higher solar cell efficiencies under conditions where current may be limited by ionic diffusion, such as under conditions of high light intensity, high viscosity solvent, or thicker solar cells, for example.

Alternatively, the solar cell 44 can also be described as having a first planar electrode (TCO layer 26 on the substrate 24) and second planar electrode having a plurality of finger-like electrode structures extending therefrom (platinum layer 36). Further, the second planar electrode having a plurality of finger-like electrode structures extending therefrom may be fabricated first. An insulative layer 34 may then be disposed over the planar electrode having a plurality of finger-like electrode structures extending therefrom, followed by the deposition of the semiconductor layer 28, introduction of the dye, injection of the electrolyte solution 40, and contact with the first planar electrode.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A solar cell comprising:
   a substrate;
   a transparent conductive oxide (TCO) layer disposed on the substrate;
   a semiconductor layer disposed on the transparent conductive oxide (TCO) layer;
   one or more micro-channels formed in the semiconductor layer, wherein none of the one or more micro-channels extends entirely through the semiconductor layer;
   a porous insulative layer disposed on the semiconductor layer and disposed within each of the one or more micro-channels; and
   a catalyst layer disposed on the insulative layer and disposed within each of the one or more micro-channels.

2. The solar cell, as set forth in claim 1, wherein the substrate comprises glass.

3. The solar cell, as set forth in claim 1, wherein the transparent conductive oxide (TCO) layer comprises fluorine-doped oxide (F-$SnO_2$).

4. The solar cell, as set forth in claim 1, wherein the semiconductor layer comprises a thickness in the range of approximately 1–50 microns.

5. The solar cell, as set forth in claim 1, wherein the semiconductor layer comprises a porous material having a plurality of nanocrystals.

6. The solar cell, as set forth in claim 5, wherein each of the plurality of nanocrystals has a diameter in the range of approximately 10–400 nanometers.

7. The solar cell, as set forth in claim 5, wherein the semiconductor layer comprises titanium oxide.

8. The solar cell, as set forth in claim 1, wherein the semiconductor layer comprises a dye-sensitized semiconductor layer.

9. The solar cell, as set forth in claim 1, wherein the semiconductor layer comprises an electrolyte solution.

10. The solar cell, as set forth in claim 9, wherein the electrolyte solution comprises an organic solvent and iodide.

11. The solar cell, as set forth in claim 9, wherein the catalyst layer is provided to catalyze electron transfer to an oxidant in the electrolyte solution.

12. The solar cell, as set forth in claim 1, wherein each of the one or more micro-channels comprises a channel-width of less than or equal to approximately 1 micron.

13. The solar cell, as set forth in claim 1, wherein each of the one or more micro-channels is spaced approximately 4 microns from any directly adjacent of the one or more micro-channels.

14. The solar cell, as set forth in claim 1, wherein the porous insulative layer comprises silica.

15. The solar cell, as set forth in claim 1, wherein the porous insulative layer comprises alumina.

16. The solar cell, as set forth in claim 1, wherein the catalyst layer comprises platinum.

17. The solar cell, as set forth in claim 1, wherein the catalyst layer comprises carbon.

18. The solar cell, as set forth in claim 1, comprising a sealing layer disposed on the catalyst layer.

* * * * *